United States Patent [19]

Sareshwala

[11] Patent Number: 5,114,191
[45] Date of Patent: May 19, 1992

[54] PIPE FITTING WITH COUPLING BODY AND IMPROVED ISOLATION TOOTH ARRANGEMENT

[75] Inventor: Sohel A. Sareshwala, San Leandro, Calif.

[73] Assignee: Lokring Corporation, Foster City, Calif.

[21] Appl. No.: 573,345

[22] Filed: Aug. 24, 1990

Related U.S. Application Data

[63] Continuation-in-part of Ser. No. 497,505, Mar. 22, 1990.

[51] Int. Cl.⁵ .............................................. F16L 35/00
[52] U.S. Cl. ................... 285/115; 285/302.2; 285/417
[58] Field of Search ................. 285/382.2, 382.7, 417, 285/115; 403/285, 281

[56] References Cited

U.S. PATENT DOCUMENTS

| | | | |
|---|---|---|---|
| 3,889,989 | 6/1975 | Legris | 285/382.7 X |
| 4,061,367 | 12/1977 | Moebius | 403/285 X |
| 4,482,174 | 11/1984 | Puri | 285/417 X |

*Primary Examiner*—Dave W. Arola
*Attorney, Agent, or Firm*—Fliesler, Dubb, Meyer & Lovejoy

[57] ABSTRACT

A pipe coupling (100) including a coupling body (104) and a swage ring (102) for urging over the coupling body (104) in order to secure the pipes (122) together. The coupling body (104) includes a main sealing tooth (105) with an outboard isolation tooth arrangement (106). The isolation tooth arrangement (106) includes a plurality of isolation gripping teeth (108) which allows for a reducing gradient of pipe deformation in a direction toward the edge 118 of the coupling body (104) of the pipe fitting (100).

36 Claims, 9 Drawing Sheets

PIPE FITTING WITH COUPLING BODY AND IMPROVED ISOLATION TOOTH ARRANGEMENT

CROSS-REFERENCE

The present application is a continuation-in-part of U.S. patent application Ser. No. 07/497,505 filed on Mar. 22, 1990 and entitled "PIPE FITTING WITH IMPROVED COUPLING BODY".

FIELD OF THE INVENTION

The present invention is directed to a pipe fitting which allows pipes to be joined and sealed together with a mechanical fitting.

BACKGROUND OF THE INVENTION

Currently available are a number of mechanical fittings which allow the joining together of two or more pipes or tubes through the application of mechanical force. The pipe fitting generally involves the deformation of a portion of the tube or pipe and a portion of the fitting itself when mechanical force is applied. A successful example of a tube fitting is described in U.S. Pat. No. 4,482,174 issued on Nov. 13, 1984 and entitled "APPARATUS AND METHOD FOR MAKING A TUBE CONNECTION," which patent is under license to the present assignee and which patent is incorporated herein by reference. This patent describes a tube fitting for joining two tubes together which include a coupling body having an inner cylindrical surface and an outer cylindrical surface and first and second swage rings. The swage rings can be mechanically urged over the outer surface of the coupling body from the first and second ends, respectively, of the coupling body. The two tubes to be joined are inserted into the first and second ends of the coupling body, respectively. The inner surface of the coupling body includes one or more teeth which are urged into engagement with the tubes in order to provide a mechanical seal. The outer surface of the coupling body includes protrusions. When the swage rings are urged over the coupling body, the swage rings force the protrusion inwardly causing the teeth to be urged into biting engagement with the pipe creating the above mechanical seal and connection. Such devices use one or more teeth and/or protrusions.

While the above fitting has proved to be highly successful, improvements have been developed which enhance the mechanical sealing and connection function.

SUMMARY OF THE INVENTION

The present invention provides for a pipe fitting with an advantageously improved coupling body. It is an object of the present invention to provide for a pipe fitting which has enhanced tensile strength making it more difficult for the pipes or tubes to be pulled out of the fitting along an axial direction.

It is an object of the present invention to provide for a pipe fitting that can withstand high burst pressures which can be responsible in part for tensile loading.

It is yet another object of the present invention to provide for a pipe fitting which has an enhanced ability to seal tubes with irregular surfaces, namely outside diameter surface imperfection such as handling scratches and the like.

It is yet a further object of the present invention to provide for a pipe fitting which prevents bending, rooking or flexing and associated fatigue of the pipe about the point where the mechanical seal is made between the pipe fitting and the pipe.

It is another object of the present invention to provide for a pipe fitting which prevents high axial shears along the longitudinal axis thereof.

It is still another object of the present invention to provide a pipe fitting which has a plurality of teeth with grooves defined between the teeth, which grooves have sufficient dimensions so that the pipe to be joined is not substantially deformed in the area between adjacent teeth. Such an arrangement is particularly advantageous for a thin walled pipe as the grooves with such dimensions will not push the pipe away from the teeth so as not to reduce the sealing effectiveness of the teeth. Further, such an arrangement is resistant to failure due to rocking or bending of the pipe about the fulcrum created by the engagement of the main sealing tooth with the pipe.

In accordance with the invention, a pipe fitting for making pipe connections comprises a coupling body with a body inner surface and a pipe receiving end adapted for receiving a pipe, and a body outer surface, and a swage ring which defines a ring inner surface, which ring inner surface is urgeable over the body outer surface in order to cause at least part of the body inner surface to engage the pipe to create a seal. The fitting further including the body inner surface defining a main sealing tooth means for creating a main seal between the coupling body and the pipe as the swage ring is urged over the body outer surface. The body inner surface defines an isolation tooth located outboard of the main sealing tooth and adjacent the pipe receiving end for isolating the main sealing tooth for bending stress. Further, the isolation tooth producing a reducing gradient of pipe deformation in the direction toward the pipe receiving end of the coupling body.

In another aspect of the invention, the isolation tooth of the pipe fitting includes a plurality of isolation gripping teeth.

In still another aspect of the invention, the plurality of isolation gripping teeth includes gripping teeth located proximally to the main sealing tooth and gripping teeth located distally from the main sealing tooth. The body outer surface adjacent the isolation tooth and the isolation tooth are configured in such a way that minimum pipe deformation occurs adjacent the distal teeth and maximum pipe deformation occurs adjacent the proximal teeth.

DETAILED DESCRIPTION OF THE PREFERRED EMBODIMENT

Figure 1:
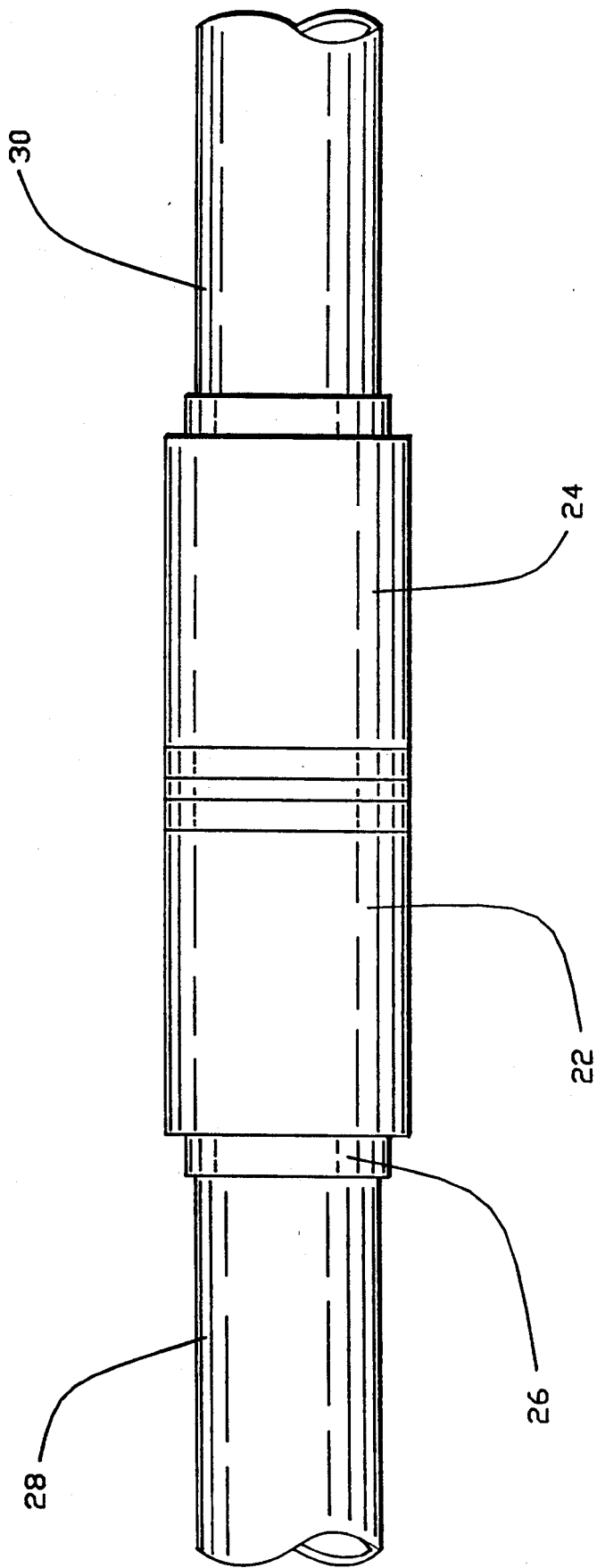
FIG. 1 depicts a plan view of an embodiment of the invention.

With respect to the figures and in particular to FIG. 1, an embodiment of the pipe fitting 20 of the invention is depicted. Pipe fitting 20 includes, in this particular embodiment, first and second swage rings 22, 24 which are urged over a coupling body 26 in order to secure together in a hermetically sealed manner first and second pipes 28, 30. It is noted that the pipe fittings of the invention can be used equally well with pipes, tubes and/or other conduits and that such pipes, tubes and/or other conduits shall be collectively referred to as pipes herein. Further, it is noted that while a preferred embodiment is discussed with respect to an arrangement wherein two pipes are joined together with a pipe fitting such as pipe fitting 20, other embodiments can include an arrangement wherein the pipe fitting is previously secured to a pipe in a conventional manner, such as by welding, such that only one swage ring, such as swage ring 24, is required to seal a separate pipe to the pipe fitting. Such arrangement can also include "T" joints, elbows and the like wherein one or more of the connections is accomplished in accordance with the invention and the other connections are accomplished conventionally by welding and the like. Further, it is to be understood that the coupling body can be constructed of any malleable metal such as aluminum, steel, copper and the like whereas the swage rings are generally constructed of a metal of equal or higher strength. Further, the coupling body and swage rings can also be comprised of, by way of example only, plastic materials, polymers and composite materials having various fibers and filaments therein.

Figure 2:
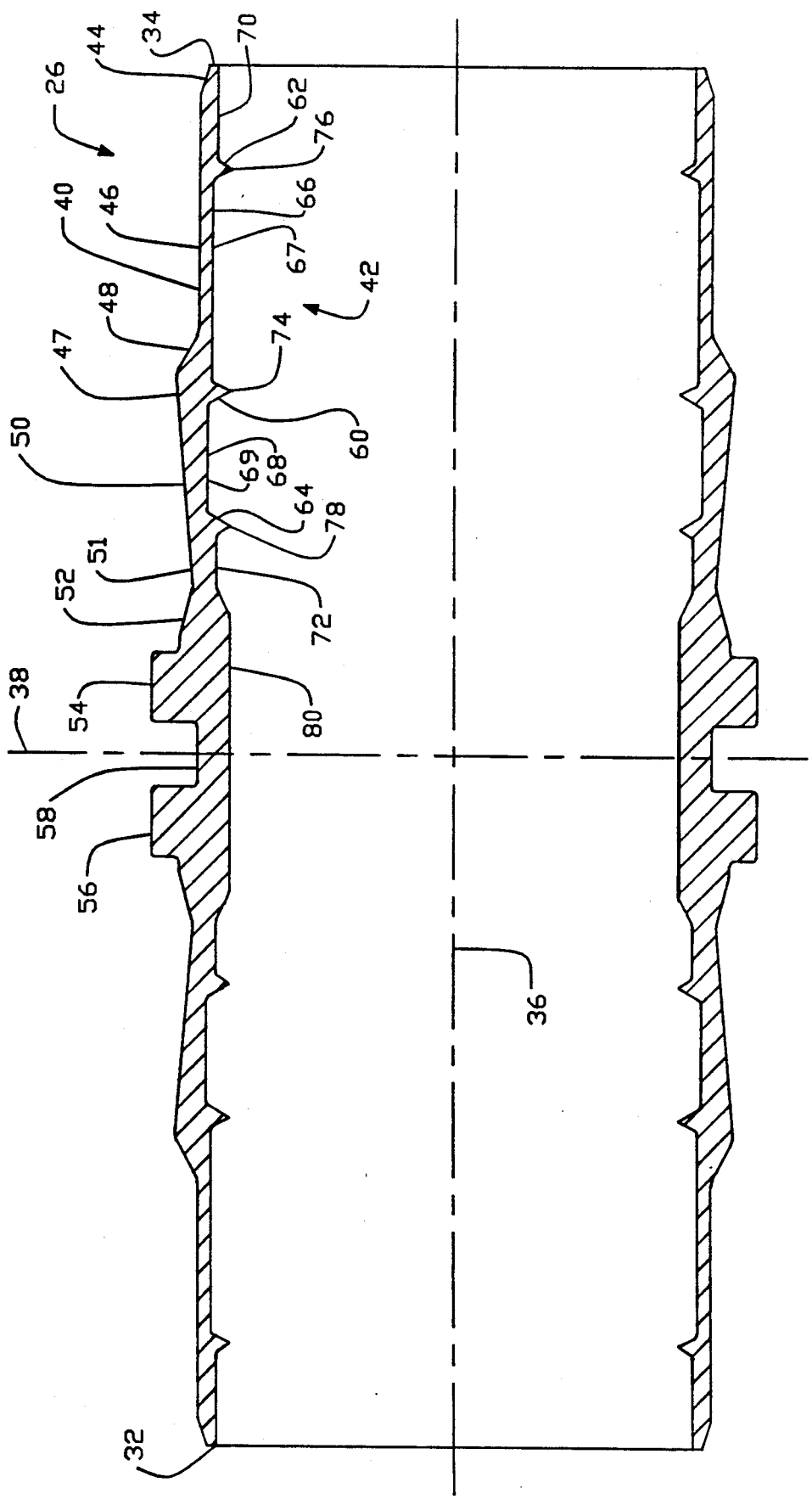
FIG. 2 depicts a partial cross-sectional view of a coupling body of an embodiment of the invention of FIG. 1 prior to the swage ring being urged over the coupling body.

The coupling body 26 of FIG. 2 is shown in a cross-sectional view taken through a diameter of the coupling body 26 prior to the swage rings 22, 24 being urged over the ends such as ends 32, 34, respectively. The swage rings 22, 24 cause deformation of the coupling body 26, such that the coupling body 26 bites into and secures the two pipes 28, 30 together. It can be seen that not only is the coupling body 26 symmetrical about cylindrical axis 36 but it is similarly symmetrical about radial axis 38. Thus, the following discussion concerning the portion of the coupling body 26 which lies above the cylindrical axis 36 and to the right of the radial axis 38, applies equally to all other similarly shaped portions of the coupling body.

As can be seen in FIG. 2, the coupling body 26 has an outer surface 40 and an inner surface 42. The outer surface 40 includes an initial outboard facing incline cylindrical surface 44 which facilitates the initial engagement of the swage ring 24 over the end 34 of the coupling body 26. Following the incline cylindrical surface 44 the coupling body defines a substantially flat cylindrical surface 46. Following the flat cylindrical surface 46, a substantial cylindrical ramp 48 is defined followed by a flat cylindrical surface or sealing rib 47 and a substantial inboard facing incline cylindrical surface which in the above identified patent and hereafter is referred to as reverse taper 50. Following the reverse taper 50, there is a short flat cylindrical surface 51 to facilitate manufacturing, and a further outboard facing incline cylindrical surface 52. Next to incline cylindrical surface 52, is an externally extending cylindrical stop flange 54 which stops the progress of the swage ring 24 as it is urged over the coupling body 26. It is noted that a similar cylindrical stop flange 56 stops the movement of the other swage ring 22 over the coupling body 26. The cylindrical stop flanges 54, 56 are separated by a cylindrical spacer flat 58.

The inner surface 42 of the coupling body 26 has in a preferred embodiment a plurality of teeth including main sealing tooth 60, an outboard isolation tooth 62 and an inboard tooth 64.

The main sealing tooth 60 and the outboard isolation tooth 62 define therebetween a first groove 66. The main sealing tooth 60 and the inboard tooth 64 define therebetween a second groove 68. Further, a pipe receiving groove 70 is defined outboard of the outboard isolation tooth 62 with an additional groove 72 defined inboard of the inboard tooth 64. The first and second grooves 66, 68 define groove bottom surfaces 67, 69, respectively. In a preferred embodiment, the lands 74, 76 and 78 of the teeth 60, 62, and 64, respectively, along with the internal cylindrical surface 80 which is located adjacent the stop flange 54 define a cylinder which is approximately the outer diameter of the pipe to be inserted into the coupling body 26.

As can be seen in FIG. 2, the main sealing tooth 60 is located adjacent to the sealing rib 47. The second tooth 62 is located adjacent the flat cylindrical surface 46 with the inboard tooth 64 located adjacent the lower portion of the reverse taper 50. As more fully described in the above incorporated patent, the reverse taper 50 assists in driving the main sealing tooth 60 into the pipe in order to secure the pipe within the coupling body 26.

It is to be understood that the reverse taper 50 can be replaced by another type of protrusion, such as, for example, an elevated land, in order to perform the function of assisting in driving the main sealing tooth into the pipe.

The design of the coupling body 26 is such that when the swage ring 24 is urged over the coupling body the main sealing tooth 60 is urged into substantial biting and sealing engagement with the outer surface of the pipe 30. This sealing is caused as the swage ring 24 is urged passed the reverse taper 50. The isolation tooth 62 is designed to make at least a minimal bite into the outer surface of the pipe 30, while the inboard tooth 64 is additionally designed to make at least a minimal bite into the outer surface of the pipe 30. However in the optimal design, the inboard tooth 64 bites into the pipe an amount less than the isolation tooth 62 with the isolation tooth 62 biting into the pipe an amount equal to or less than the amount that the main sealing tooth 60 bites into the pipe.

The purpose of the main sealing tooth 60 is to substantially engage the surface of the pipe in order to provide a hermetical seal so that no fluid flowing through the pipe can be released between the tooth and the pipe. The tooth 60 bites into the outer surface of the pipe, and simultaneously is somewhat smashed so as to fill any of the rough or irregular outside surface imperfections which are commonly found on the outside of the pipe. The tooth 60 is sufficiently wide and has a sufficient profile such that it resists tensile loading along the axis of the pipe which could occur should there be a force on the pipe which might tend to pull it out of the coupling body. Such tensile loading can, in part, be created by high burst pressures as would be loaded onto the coupling by the fluid inside the pipe.

The first and second grooves 66, 68 located on opposite side of the main sealing tooth 60 are designed with a length and a depth such as that the portion of the pipe located adjacent such grooves is not substantially deformed as the swage ring is urged over the coupling body. If the pipe is in fact deformed, the grooves 66, 68 are of sufficient length and depth so that pipes can spring back to substantially their original shape after the swage ring has been fully seated over the coupling body. Such an arrangement is advantageous as it increases the tensile strength of the fitting due to the fact that the entire original diameter of the pipe must be overcome, as it interferes with the entire length of the tooth, before the pipe can be forced out of the coupling body due to tensile loading resulting from burst pressure or other forces. Further, as the portions of the pipe on either side of the main sealing tooth 60 are not substantially deformed by the coupling body, the portion of the pipe adjacent the main sealing tooth is not substantially deformed and simultaneously urged away from the main sealing tooth 60 at the very time when the swage ring 24 is compressing the reverse taper 50 in order to urge the main sealing tooth 60 toward the pipe. Thus the present design allows the main sealing tooth 60 to be used to maximum advantage to provide a seal without the coupling body itself forcing the pipe away from the tooth 60.

The outboard isolation tooth 62 as well as the inboard tooth 64 prevent the pivoting or rocking of the pipe about a fulcrum established where the main sealing tooth 60 bites into the pipe. Accordingly, the pipe is prevented from bending or flexing about the main sealing tooth 60, thus preventing relative motion between main sealing tooth 60 and the pipe and thus leakage at the point where the main sealing tooth engages the pipe 30. Such relative motion between main sealing tooth 60 and the pipe can cause the tooth 60 to plastically deform and wear resulting in the seal being compromised with resultant leakage. It is to be understood that for purposes of preventing such bending or rocking, that the outboard isolation tooth 62 is of most importance and that the inboard tooth 64 can in some embodiments, for purposes of economy, be dispensed with.

Such a design has a particular advantage with respect to thin walled pipes as the pipe is not collapsed away from the main sealing tooth 60 due to the contacting of the pipe caused by the first and second grooves on either side of the main sealing tooth and thus the main sealing tooth can more substantially bite into the thin walled pipe. Further, the arrangement increases the tensile loading which can be placed on the pipe fitting, as again, the pipe on the sides of the main sealing tooth maintains its substantial original diameter and thus maintains substantial interference between the original outside diameter of the pipe and the depth of the main sealing tooth 60.

Figure 3:
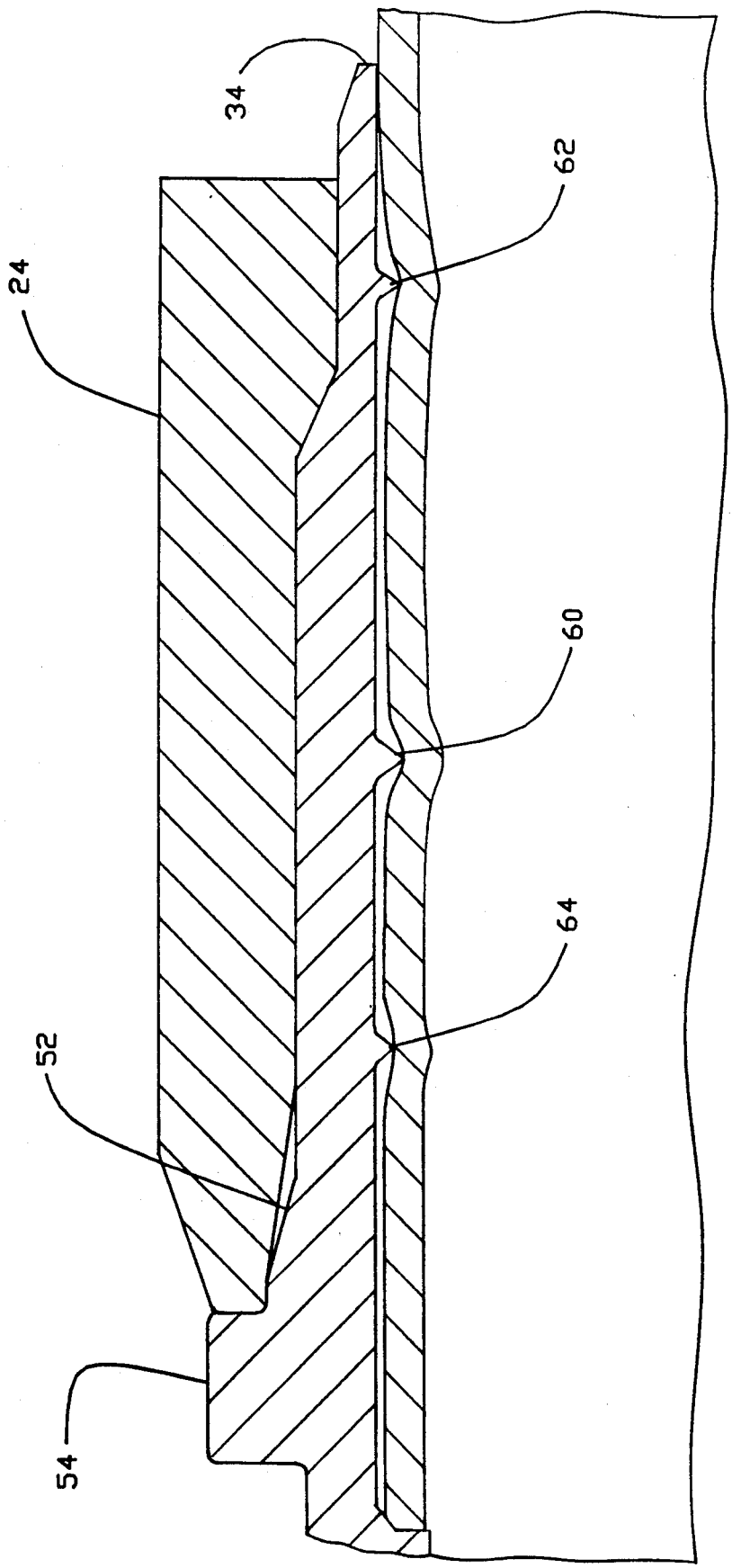
FIG. 3 depicts a partial cross-sectional view of the embodiment of FIG. 1 with the tooth arrangement deformed against a pipe.

FIG. 3 demonstrates a cross-sectional view taken from the portion of FIG. 2 which has been previously described showing the swage ring 24 in place over the coupling body 26 with the main sealing tooth 60, the outboard isolation tooth 62, and the inboard tooth 64 engaging the pipe 30.

Figure 4:
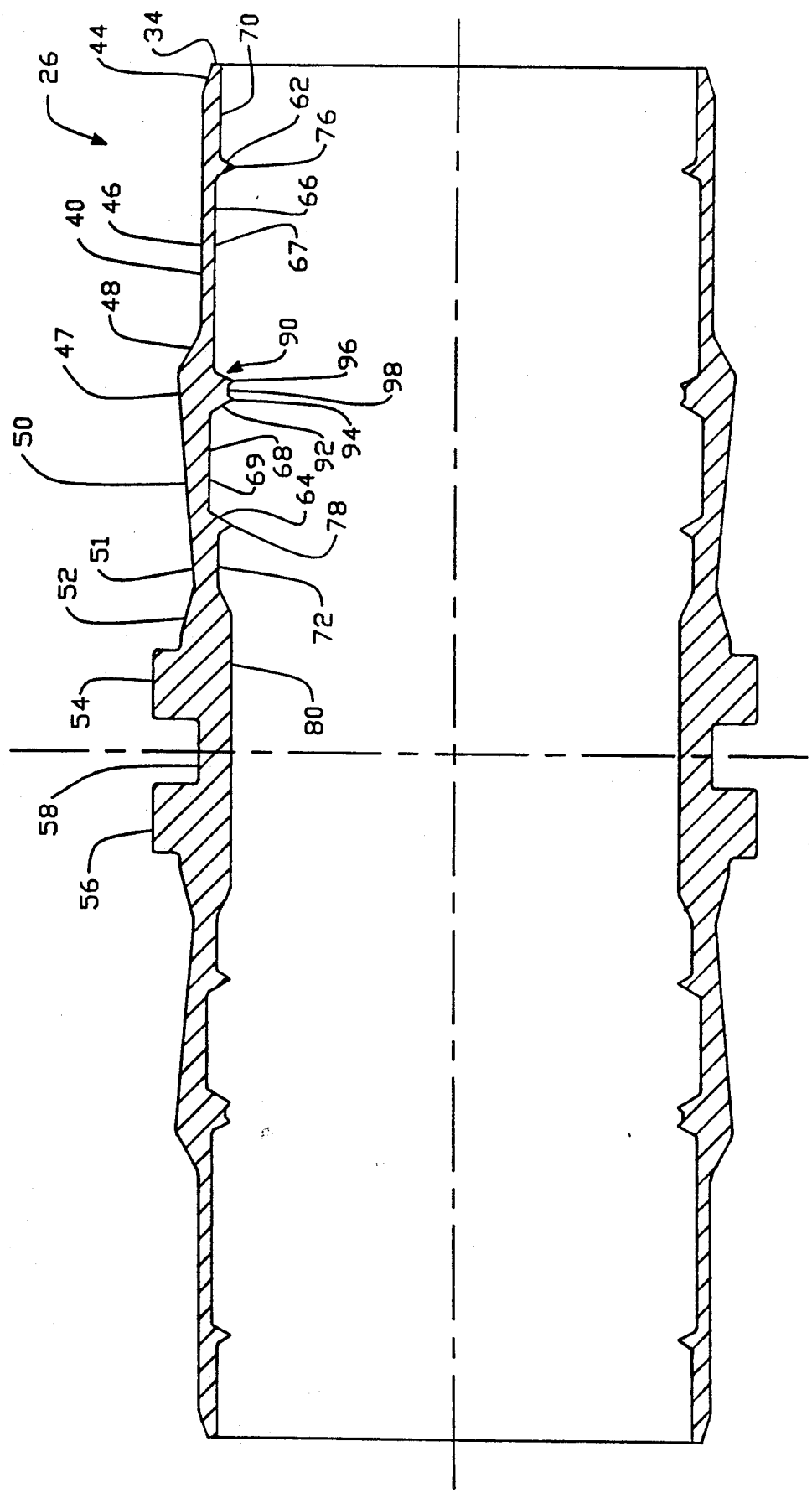
FIG. 4 depicts another coupling body of an embodiment of the invention having a twin tooth arrangement prior to a swage ring being urged over the coupling body.
Figure 5:
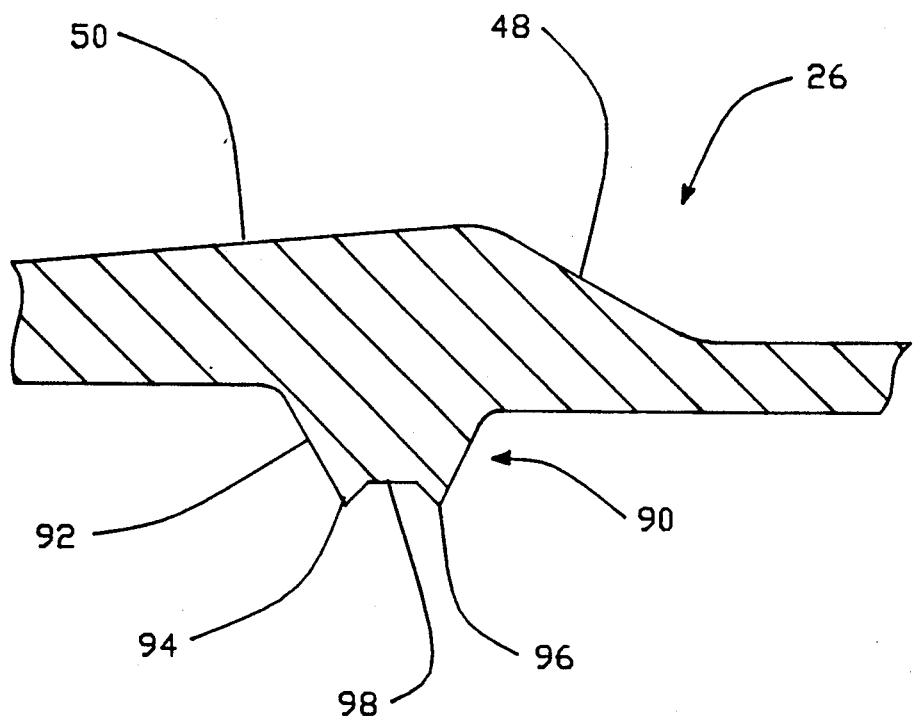
FIG. 5 depicts an enlargement of the twin tooth arrangement of FIG. 4.
Figure 6:
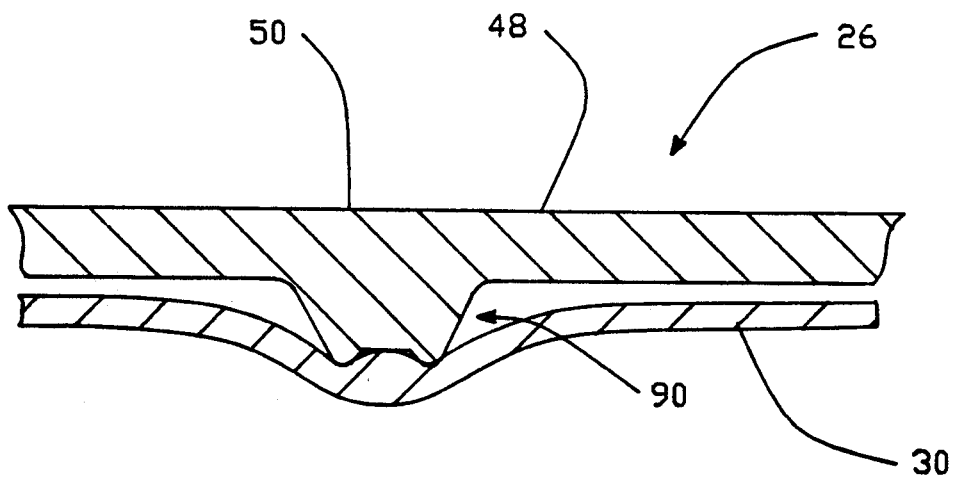
FIG. 6 depicts an enlargement of a twin tooth arrangement deformed against a pipe.

An alternate embodiment of the main sealing tooth 60 is depicted in FIGS. 4, 5 and 6. In this embodiment, the main sealing tooth 60 is replaced with a twin tooth 90. The twin tooth 90 includes a parent tooth 92 and extending therefrom a first sealing tooth 94 and a second sealing tooth 96. A groove 98 is defined between the first sealing tooth 94 and the second sealing tooth 96. In this embodiment, the width of the parent tooth 92 is larger than the width of the main sealing tooth 60 of the prior embodiment while the width of the first sealing tooth 98 and the width of the second sealing tooth are smaller than the width of the main sealing tooth 60. The first sealing tooth 94 and the second sealing tooth 96 have knife-edges. The two sealing teeth 94, 96 bite into the outside surface of the pipe and at the same time mushroom and smash themselves to fill up crevices, cracks and other surface imperfections on the outside of the pipe. The wide parent tooth 92 provides tensile shear strength once the two sealing teeth 94, 96 have been smashed and also provides high compressive strength to deform the outer surface of a thick walled pipe. The twin tooth design also provides for good hermetic sealing for thin walled pipes as the sealing teeth 94, 96 bite into the thin walled pipe without the parent tooth simply deforming the pipe and this design can also withstand the tensile shearing loads required of teeth used with thick walled pipes. It is to be understood that an alternative embodiment of the invention can have only one sealing tooth mounted on the parent tooth.

FIG. 6 shows a cross-sectional view of the twin tooth 90 after a swage ring has been urged over the coupling body urging the twin tooth into sealing engagement with the pipe.

Figure 7A:
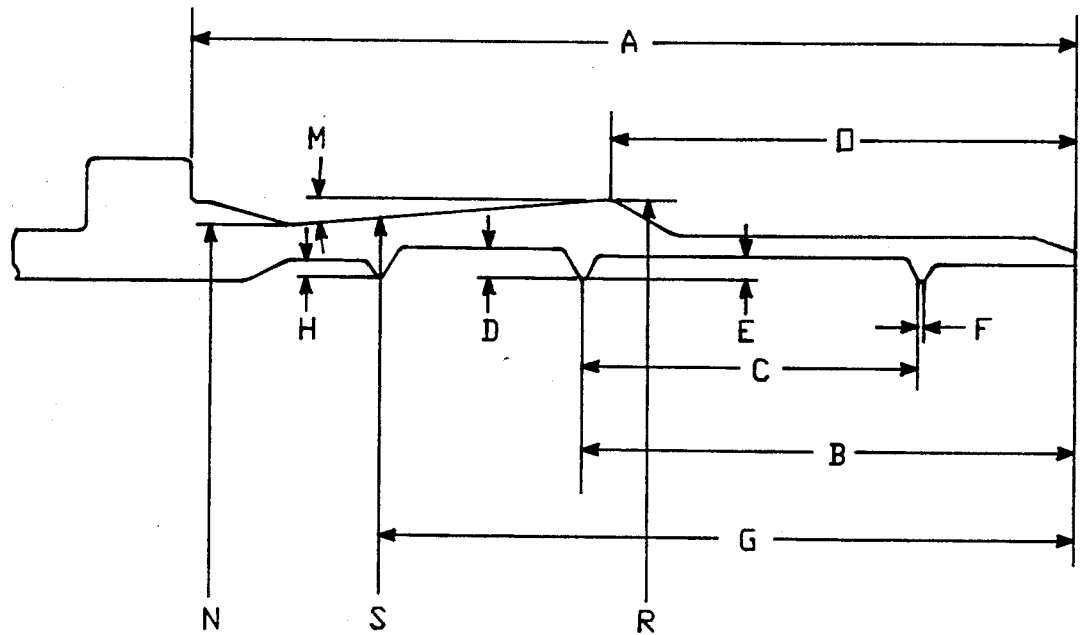
FIGS. 7A and 7B depict a schematical representation of portions of the coupling body of the invention.

Equations describing the preferred embodiment of the present invention have been derived by fitting curves to empirically derive coupling body dimensions. FIG. 7A depicts a portion of the coupling body of FIG. 2 and identifies the dimensions which are described by the below formula.

It is to be understood that for each dimension described by the formulas, first a general formula is given with ranges for the constant values. These ranges for the constant values produce preferred minimum to maximum values of the dimensions for a preferred embodiment made of any material. Also for each dimension there is a formula with specific constant values which describe a preferred embodiment for stainless steel and/or a copper-nickel material, as specified. Further, it is to be understood that dimensions other than those prescribed by the formulas can be successfully used to practice the invention and fall within the spirit and scope of the invention as claimed. The below formula use input values in inches and give results in inches. These formulas can be used with other measuring units by changing the constant values.

Further, the formulas are described with respect to nominal dimensions without consideration being given to tolerances.

Length of One End of the Coupling Body (A)

The length of substantially one end of the coupling body as designated by the letter A in FIG. 7A for all materials is described by the formula:

$$A = K1 + K2 \text{ (actual pipe outside diameter)}$$

where
K1 = 0.01 to 0.5
K2 = 0.2 to 1.75

Specific Formula

The length of substantially one end of the coupling body as designated by the letter A in FIG. 7A for stainless steel is described by the formula:

$$A = 0.534 \ (10)\text{exp.}[0.265 \ (\text{actual pipe outside diameter})]\text{ps}$$

where exp. means raised to the power of.

For copper nickel material the length A has been empirically derived to be:

$$A = 0.314 + 0.77 \text{ (actual pipe outside diameter)}$$

The length of the body A relates to the amount of bending that the coupling body can resist. Thus, for an optimal length, A should not be too short otherwise there may be failure due to flexing. Such flexing causes relative motion to occur between the main sealing tooth and the pipe resulting in leakage. Further, if the lengths were too short, the below specified grooves between the various teeth would not be able to fit within the coupling body.

Groove Depth for the Main Sealing Tooth (D)

General Formula

For all materials, the empirically derived formula for the grooved depth of the main seal tooth as designated by the letter D if FIG. 7A is given by the formula:

$$D = (\text{Theoretical pipe deformation at the location of he main sealing tooth}/2) + K3 \ (\text{actual pipe outside diameter}/T) \text{ exp. } K4$$

where
T = (maximum wall thickness minimum wall thickness of a pipe)/2
and where
K3 = 0.0001 to 0.05
K4 = 0.05 to 0.5.

Specific Formula

For stainless steel or copper nickel or other material, the empirically derived formula for the grooved depth of the main seal tooth as designated by the letter D in FIG. 7A is given by the formula:

$$D = (\text{theoretical pipe deformation at the location of the main sealing tooth}/2) \ 0.006 \ (\text{actual pipe outside diameter}/T) \text{ exp. } 0.245$$

where
T = (maximum wall thickness minimum wall thickness of a pipe)/2

In the above formulas, the theoretical pipe deformation at the sealing tooth 60 is an empirically derived number based on the amount of deformation desired given the type of pipe and the tensile loading involved. By way of example only, for a pipe having an actual outside diameter of one inch, it may be desired that there by a theoretical deformation of about 1% to 7%, depending on the materials used, the wall thicknesses, and the pipe tolerance. The formula indicates that the length of the main seal tooth is proportionate to the amount of deformation desired. Thus, if more deformation is desired for the particular embodiment, the formula will call for a longer main seal tooth and thus a larger groove depth D.

Groove Depth Isolation Tooth(E)

General Formula

The groove depth E for the isolation tooth 62 as identified in FIG. 7A for all materials is defined as follows:

$$E = (\text{theoretical pipe deformation caused by the isolation tooth}/2) + K5 + K6 \ (\text{actual pipe outside diameter})/T$$

where
T = (maximum wall thickness*minimum wall thickness)/2
and where
K5 = −0.01 to 0.01
K6 = 0.00005 to 0.04

Specific Formula

The groove depth E for the isolation tooth 62 as identified in FIG. 7A for stainless steel or copper nickel or other material is defined as follows:

$$E = (\text{theoretical pipe deformation caused by the isolation tooth}/2) + 0.00521 + 0.000419 \ (\text{actual pipe outside diameter})/T$$

where
T = (maximum wall thickness + minimum wall thickness)/2

For purposes of this equation, the theoretical pipe deformation at the isolation tooth 62 is derived in much the same manner as the theoretical pipe deformation for the main seal tooth is derived for the above equation with respect to the groove depth of the main seal tooth. In a preferred embodiment and by way of example only, with the pipe deformation at the main sealing tooth 60 being 1% to 7%, the theoretical deformation at the isolation tooth 62 can be, for example, 0% to 5%. By way of example, the theoretical pipe deformation at the inboard tooth 64 would then be less than 3% and in a preferred embodiment is between 0% and 3%.

Groove Width, Between Main Seal Tooth and Isolation Tooth (C)

General Formula

For all materials, the groove width between the main seal tooth 60 and the isolation tooth 62 is described by the formula:

$$C = K7 + K8 \ (\text{actual pipe outside diameter})/T$$

here
T = is defined hereinabove
and
K7 = −0.2 to 0.15
K8 = 0.0001 to 0.06

Specific Formula

For both stainless steel and copper nickel material and other materials, the groove width between the main seal tooth 60 and the isolation tooth 62 is described by the formula:

$$C = 0.006 + 0.024650 \text{ (actual pipe outside diameter)}/T$$

here $T =$ is defined hereinabove.

Distance to Start Main Seal Tooth (B)

General Formula

The distance from the end of the coupling body beginning of the main sealing tooth is defined by the letter B in FIG. 7A and described for all materials as follows:

$$B = K9(A) - K10$$

where
$K9 = 0.4$ to $0.9$
$K10 = -0.1$ to $0.5$

Specific Formula

The distance from the end of the coupling body to the beginning of the main sealing tooth is defined by the letter B in FIG. 7A and described for stainless steel and copier nickel as follows:

$$B = 0.635(A) - 0.129$$

Land Between Grooves (F)

The land between the grooves which is the flat area of each of the teeth as shown in FIG. 7A, is as follows:
$F = 0.008$ inches if the outside diameter of the pipe is less than 1.315 inches; and
$F = 0.008 + 0.0015$ (actual pipe outside diameter)
if the outside diameter of the pipe is equal to or greater than 1.315 inches This formula indicates that for larger diameter pipes, a larger tooth land is required in order to meet the tensile loading placed on the tooth by the pipe.

Distance to the Start, of the Inboard Tooth (G)

General Formula

The distance to the start of the inboard tooth for all materials is as follows:
G = distance to the start of reverse taper (designated as 0) + {[(the outside diameter of the coupling body at the beginning of the inverse taper (designated as R) − the outside diameter of the coupling body at a zero deformation location (designated as S))/2]/TANGENT (reverse taper angle M°)} + K11 (land between the grooves (designated as F))
where
K11 = 0.5 to 3
where
0 = the distance to the start of the reverse taper;
R = the outside diameter of the coupling body at the beginning of the reverse taper;
S = the outside diameter of the coupling body at a point of zero deformation with the swage ring driven over the coupling body; and
M = the angle of the reverse taper.

Specific Formula

The distance to the start of the inboard tooth for stainless steel and copper nickel is as follows:
G = distance to the start of reverse taper (designated as 0) + {[(the outside diameter of the coupling body at the beginning of the inverse taper (designated as R) − the outside diameter of the coupling body at a zero deformation location (designated as S))/2]/TANGENT (reverse taper angle M°)} + 1.9 (land between the grooves (designated as F))
where:
0 = the distance to the start of the reverse taper;
R = the outside diameter of the coupling body at the beginning of the reverse taper;
S = the outside diameter of the coupling body at a point of zero deformation with the swage ring driven over the coupling body; and
M = the angle of the reverse taper.

It is noted that the rationale for the distance to the start of the inboard tooth is to have an inboard tooth just touching and supporting the pipe outside diameter at a minimum tolerance condition. At minimum tolerance there is no biting of the inboard tooth into the pipe. The outside diameter of the coupling body at zero deformation is determined theoretically from a dimensional analysis or tolerance study assuming no biting of the tooth into the pipe at a minimum tolerance condition.

Inboard Tooth Groove Depth (H)

General Formula

The inboard tooth groove depth identified by the letter H in FIG. 7A is specified for all materials as follows:

$H =$ [(outside diameter of the critical section (identified by N)) − {2 (calculated wall thickness at critical section) + (internal diameter of the coupling body)}]/2 or:

K12 (groove depth of isolation tooth (E)) whichever tube is smaller where K12 = 0.1 to 1.1.

Specific Formula

The inboard tooth groove depth identified by the letter H in FIG. 7A is specified as follows:

$H =$ [(outside diameter of the critical section (identified by N)) − {2 (calculated wall thickness at critical section) + (internal diameter of the coupling body)}]/2 or:

0.6 (groove depth of isolation tooth (E)) whichever tube is smaller.

For this formula, it is noted that the outside diameter of the critical section is indicated by the letter N and that the thickness at the critical section is calculated to be a minimum wall thickness capable of withstanding the desired burst pressure. The wall thickness at the critical section is important as it is theoretically the weakest point of the coupling body.

With respect to the twin teeth and referring to FIG. 7B, the equations which describe the dimensions of the twin teeth for the above specified material are as follows:

The Width of the Parent, Tooth (I)

General Formula

The width of the parent tooth which is designated by the letter I is, for all materials, as follows:

$I = C1$ [{(pipe outside diameter) (the calculated burst pressure of the pipe)}/C2(ultimate tensile strength of the coupling body material)]

where
C1=0.2 to 1.2
C2=2 to 6

Specific Formula

The width of the parent tooth which is designated by the letter I is for stainless steel and copper nickel as follows:

$$I = 0.6 [\{(\text{pipe outside diameter})(\text{the calculated burst pressure of the pipe})\}/4(\text{ultimate tensile strength of the coupling body material})]$$

It is noted that the width is calculated based on the burst pressure required so that the tooth can withstand the tensile shear forces placed upon it. The parent tooth is also designed to support the small sealing teeth under expected compression forces.

The Width of the Small Sealing Teeth (J)

The width of the small sealing teeth is indicated by the letter J and is designated for all materials as follows:
J=C3 (width of the parent tooth) where
C3=0.01 to 0.5

Specific Formula

The width of the small sealing teeth is indicated by the letter J and is designated for stainless steel and copper nickel as follows:
J=0.15 (width of the parent tooth).

Groove Depth of the Small Sealing Teeth (K)

The groove depth of the small sealing teeth designated by the letter K is, for all materials, as follows:

$$K = C4 \text{ (actual pipe outside diameter/T) exp. } C5$$

where
C4=0.001 to 0.005
C5=0.1 to 0.5

Specific Formula

The groove depth of the small sealing teeth designated by the letter K, for stainless steel and copper nickel, is as follows:

$$K = 0.003 \text{ (actual pipe outside diameter/T) exp. } 0.251$$

Groove Ramp Angle (X)

General Formula

Figure 7B:
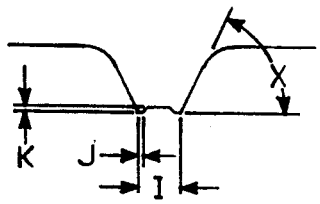

The groove ramp angle as shown in FIG. 7B, in a preferred embodiment for all materials, is defined by the formula:
Groove Ramp angle=C6°
where C6=40° to 90°

Specific Formula

The groove ramp angle as shown in FIG. 7B is equal to, in a preferred embodiment 60° for stainless steel and copper nickel. This angle was selected to afford good resistance to shear loading and to provide for appropriate biting of the sealing teeth, which extend from the parent tooth, into the pipe.

Embodiment of FIGS. 8-11

With respect to FIGS. 8 through 11, in another embodiment of the pipe fitting 100 of the invention with a swage ring 102 and a coupling body 104, the coupling body 104 includes an improved isolation tooth arrangement 106.

Figure 8:
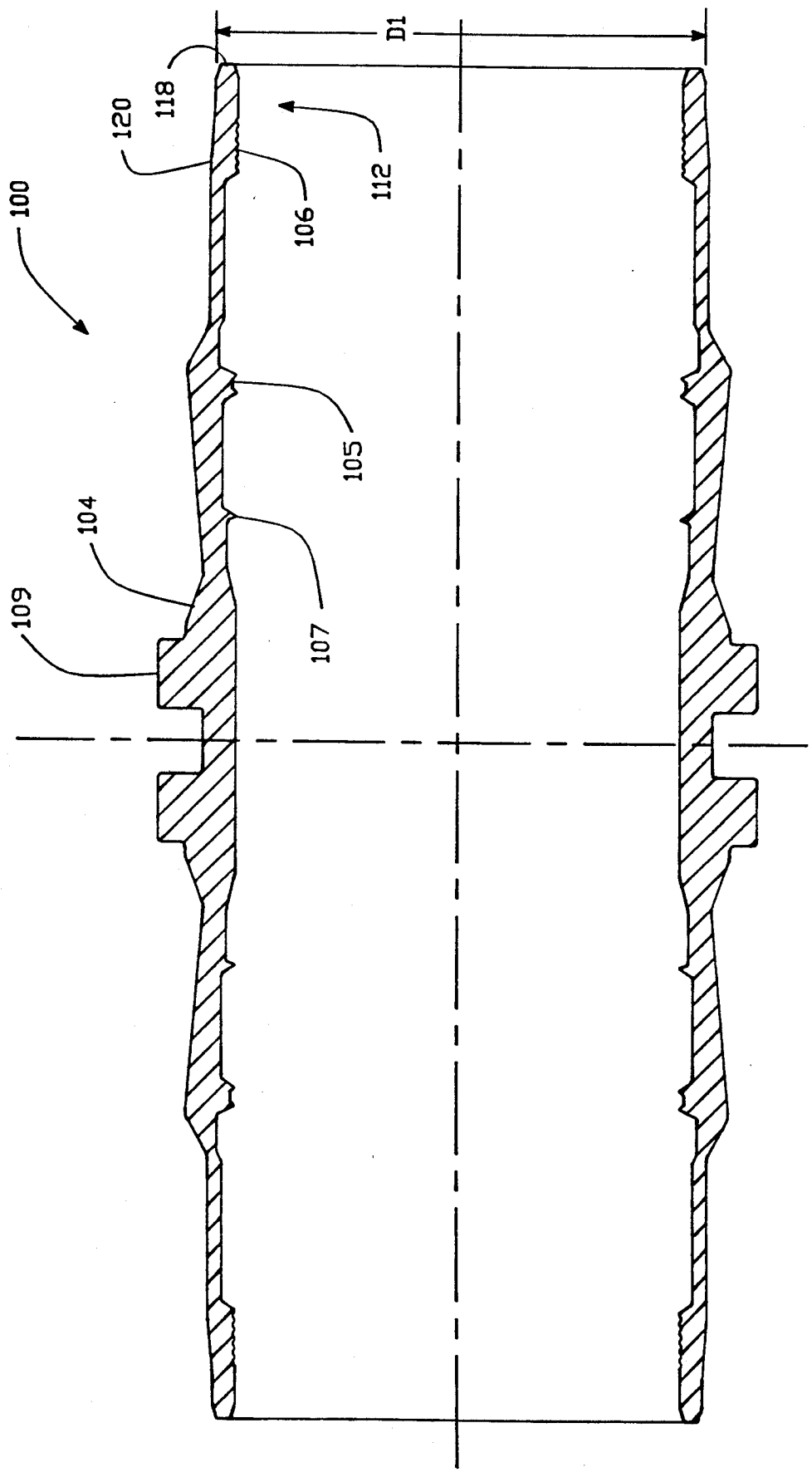
FIG. 8 depicts a cross-sectional view of another coupling body of an embodiment of the invention having an improved isolation tooth arrangement.

With respect to FIG. 8, the coupling body 104 includes a main sealing tooth arrangement 105, an inboard tooth 107 and a stop flange 109, which elements are similar to elements shown in the preceding embodiments. As can be seen in these figures, the isolation tooth arrangement 106 includes a plurality of isolation gripping teeth 108, with adjacent tooth 108 separated by a plurality of isolation tooth grooves 110.

Figure 9:
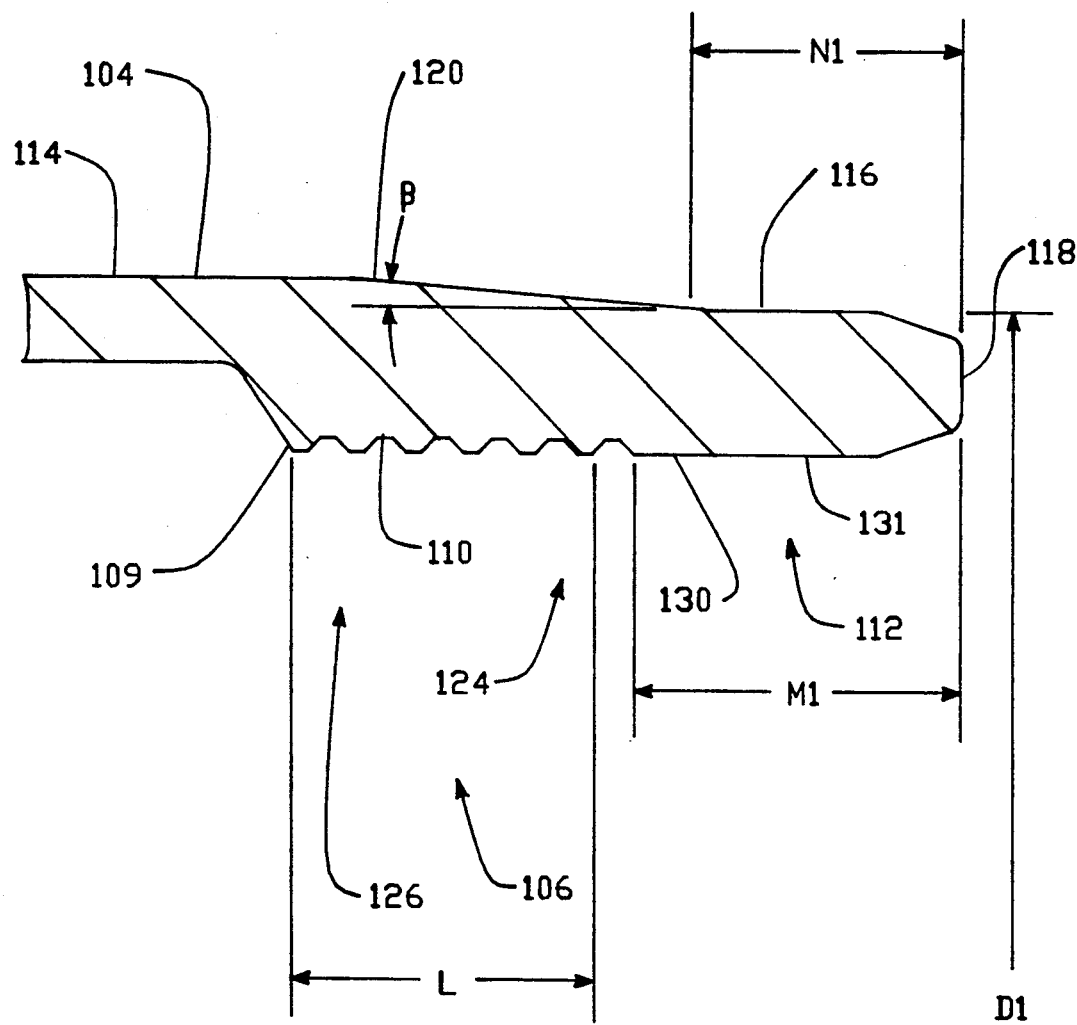
FIG. 9 depicts an enlarged, partial, cross-sectional view of the isolation tooth arrangement of FIG. 8.
Figure 11:
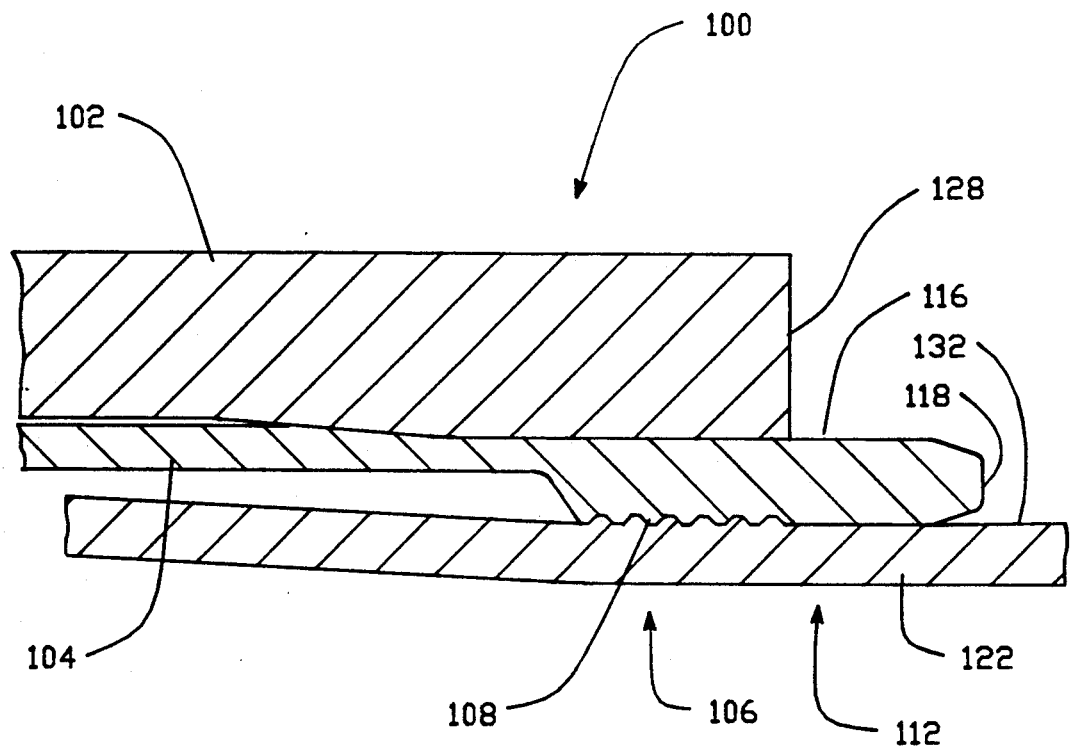
FIG. 11 depicts a partial cross-sectional view of a swage ring urged into place with respect to a coupling body in order urge the isolation tooth arrangement of the coupling body into biting engagement with the pipe.

With respect to FIGS. 8 and 9, the pipe receiving end 112 of the coupling body 104 is configured in a manner appropriate to the efficient operation of the isolation tooth arrangement 106. In particular, with respect to the pipe receiving end 112, the coupling body outer surface 114 includes an outer cylindrical surface 116 which is located adjacent the edge 118 of the coupling body 104. Continuing from the outside cylindrical surface 116 is a cylindrical ramp 120 which assists in the urging of the isolation tooth arrangement 106 into biting engagement with the pipe 122.

The ramp 120 is located on the coupling body outer surface 114 adjacent isolation tooth arrangement 106. The ramp 120 continues from the outer cylindrical surface 116 from a location just before the beginning of the isolation gripping teeth 124 located distally from the main sealing tooth arrangement 105, ramping upwardly toward the main sealing tooth arrangement 105 until it reaches a point substantially above the isolation gripping teeth 126 located proximally to the main sealing tooth arrangement 105. In the particular embodiment shown, the ramp 120 ends approximately above the isolation gripping tooth located adjacent to the most proximal isolation gripping tooth with respect to the main sealing tooth arrangement 105. The diameter of the outer cylindrical surface 116 and thickness of the coupling body 104 at the pipe receiving end 112 is designed such that when the trailing edge 128 of the swage ring 102 is urged upon installation over the pipe receiving end 112 and the outer cylindrical surface 116, the coupling body inner surface 130 just touches and/or elastically deforms the pipe outside surface 132 in the worst tolerance case with respect to the dimensions of the pipe and the fitting. The reason for this is that ideally there should not be any permanent deformation of the pipe in the region of the coupling body inner surface between the isolation tooth arrangement 106 and the edge 118. Such permanent deformation, if it occurred, would not allow the isolation gripping teeth 108 to effectively bite into the outer surface 132 of the pipe 122.

The ramp 120 is designed such that the maximum deformation of the pipe 122 by the isolation gripping teeth 108 occurs at around the first or second tooth located most proximally to the main sealing tooth arrangement 105, these teeth being identified as the proximally to the main sealing tooth arrangement 105, these teeth being identified as the proximally located isolation gripping teeth 126. Generally minimal pipe deformation occurs at the distally located isolation gripping teeth 124. Accordingly, a gradient of deformation from the distally located isolation gripping teeth 124 to the proximally located isolation gripping teeth 126 reduces stresses caused by the coupling body 104 in the pipe 122. The gradient allows for contact between (a) the inner surface portion 131 of the pipe receiving end 112 of the coupling body 104 located between the isolation gripping tooth arrangement 106 and the end 118, and (b) the outer diameter of the pipe 122 so that no gap is formed between these elements.

The present embodiment disclose in FIGS. 8 through 11 has advantages over the other embodiments (FIG. 2) disclose in this application. For example, during bending to the point of flexure fatigue, these embodiments experience high axial shear and bending stresses caused by the deflection of the embodiment about the longitudinal axis which is substantially co-linear with the longitudinal axis of the pipe. The pipe fitting in order to remain uncompromised in the ability to create a seal, needs to withstand these high stresses without any relative motion between the pipe fitting and the pipe. To achieve this result, the pipe fitting should be such that the fitting bites into the pipe 122 very tightly and rigidly between the inboard tooth 107 and isolation tooth arrangement 106 of FIG. 9. This requirement is more important with thin walled pipes which have a large diameter to thickness ratio.

The present embodiment as shown in FIGS. 8 through 11 prevents movement of the isolation tooth arrangement 106 along the longitudinal axis over the pipe surface and thereby eliminates any galling and shearing of the isolation tooth arrangement. The multiplicity of teeth as taught by the isolation tooth arrangement 106, can withstand very high unit stresses which can be induced on the pipe surface where just one tooth used as the isolation tooth.

Further, with respect to the isolation tooth of the embodiment of FIG. 2, it is possible that the use of a single isolation tooth may cause permanent deformation in the radial direction of the pipe which will not recover to its original unstressed outside diameter until a certain distance from the end of the coupling body. This can leave a gap between the outside diameter of the pipe and the inside diameter of the coupling body. This circumferential gap would allow impurities to enter the fitting and also cause relative motion.

The present embodiment as depicted in FIGS. 8 through 11 allows for an isolation tooth arrangement 106 which can contact the pipe at a plurality of locations in order to produce a reducing gradient of pipe deformation in a direction toward the pipe receiving end 112 of the coupling body. In a particular embodiment, this gradient is accomplished through the plurality of isolation gripping teeth 108. Other arrangements are possible in order to produce the reducing gradient of pipe deformation. With this reducing gradient, the deformation of the pipe 122 adjacent the edge 118 would be minimized, if not eliminated all together, allowing for a tight fit between the pipe receiving end 112 and pipe 122 in order to prevent impurities from collecting between the coupling body 104 and the pipe 122.

Further, it is to be understood that the plurality of isolation gripping teeth 108 grip the pipe outer surface in order to cause a surface gripping area instead of a circumferential line contact which would occur with the single isolation tooth in the embodiment of FIG. 2. Accordingly, in the present embodiment of FIG. 8, the unit stress on the pipe would be lower as stresses would be distributed over the surface. Thus, the isolation tooth arrangement 106 of FIG. 8 would not allow any relative motion in the axial direction between the outside diameter of the pipe and the pipe fitting 100. The plurality of isolation gripping teeth 108 would result in a plurality of deformations caused by each of the isolation gripping teeth 108 with the deformations reducing in size toward the edge 118. This plurality of deformations, produces a reducing gradient of pipe deformation in a direction toward the edge 118 of the coupling body 104. Such an arrangement resists high axial shearing forces in the longitudinal axial direction more efficiently.

Figure 10:
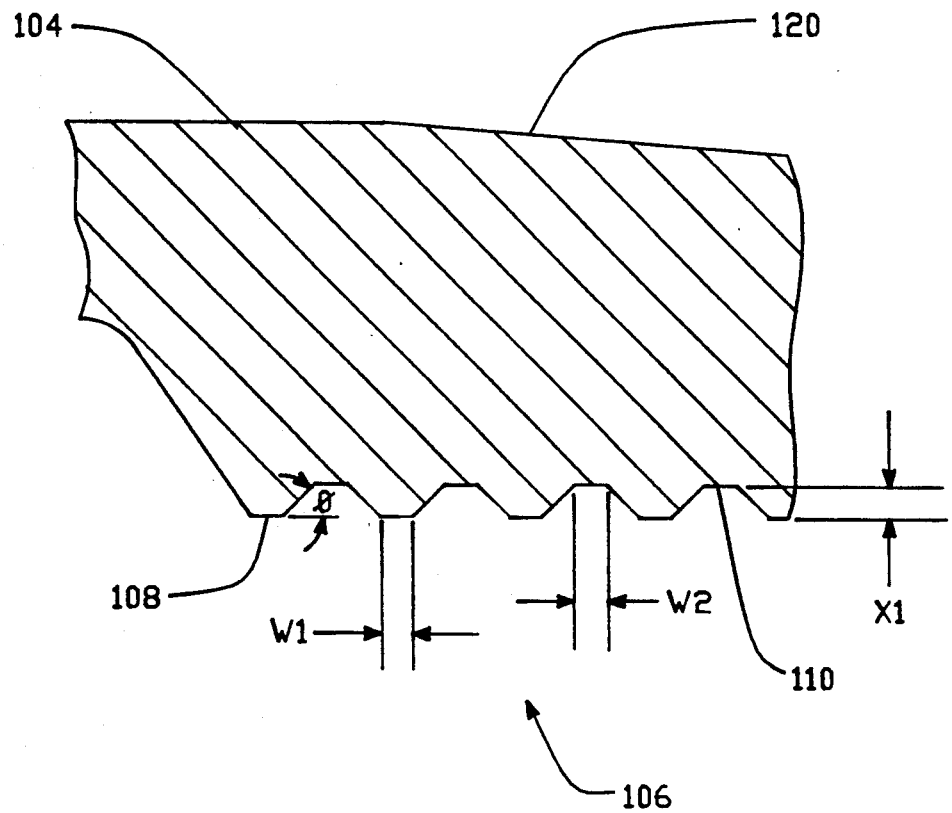
FIG. 10 depicts an enlarged, partial, cross-sectional view of several of the teeth of the isolation tooth arrangement of FIG. 9.

Equations describing the preferred embodiment of the present invention of FIGS. 8 through 11 have been derived by fitting curves to empirically derived coupling body dimensions. FIGS. 9 and 10 depict a portion of the coupling body 104 and identifies the dimensions which are described by the below formulas. It is to be understood that some of the formulas call for ranges of values which produce preferred minimum to maximum values of the dimensions for a preferred embodiment made of any material. Further, it is to be understood that dimensions other than those prescribed by the formulas can be successfully used to practice the invention and fall within the spirit and scope of the invention as claimed. The below formulas give inputs values in inches and give results in inches. These formulas can be used with other measurements by changing the constant values. Further, the formulas are described with respect to nominal dimensions without consideration being given to the tolerances.

Width of Each Isolation Gripping Tooth (W1)

The width of each isolation gripping tooth is defined in relationship to the width of the parent tooth as taught by the previous embodiments and is about:

$$W1 = \text{width of each gripping tooth} = C7 \times (\text{width of the parent tooth})$$

where $C7 = 0.05$ to $0.4$.

Number of Isolation Gripping Teeth (N1)

The number of the isolation gripping teeth desired to resist actual shear caused by pipe bending is described as follows:

$$N = \text{number of teeth} = [(\text{cross-sectional area of the pipe based on the outside diameter}) \times (\text{bending stress}) \times (\text{safety factory})]/[(\text{width of each tooth}) \times (\text{internal diameter of coupling body}) \times (\text{pi})].$$

In this formula, the cross-sectional area of the pipe, based on the outside diameter, includes the entire area defined within the circle defined by the outside diameter of the pipe including the area of the void inside the pipe. The bending stress is the amount of bending stress which will be experienced by the pipe. The safety factor is a multiple of the bending stress. The safety factor can be the value 1 or, less and, but is generally the value 1 and greater such as for example, extending up to several times the bending stress expected.

Isolation Gripping Tooth Groove Depth (X1)

As can be seen in the figures, there is a gripping tooth groove between adjacent gripping teeth and the depth of the gripping tooth groove is described as follows:

$$X1 = \text{gripping tooth groove depth} = C8 \times (\text{theoretical percent deformation at the pipe receiving end}) \times (\text{pipe outside diameter})/2$$

where $C8 = 0.2$ to $1$.

In the formula, the theoretical percent deformation at the pipe receiving end is estimated in a manner similar to other embodiments hereof. As previously discussed, by way of example, the deformation is estimated to be between 0% to 5%.

Width Between Adjacent Isolation Gripping Teeth (W2)

The gripping teeth are spaced apart from each other by a distance which is about:

$W2$ = distance between adjacent gripping teeth = $C9 \times$ (width of a gripping tooth)

where $C9 = 1$ to 5.

Span of Teeth (L)

The span of the isolation gripping teeth is given as follows:

$L$ = span = (number of gripping teeth) (width of each gripping tooth) + (number of gripping teeth − 1) (distance between adjacent gripping teeth) + 2 (number of gripping teeth) (gripping tooth grooves depth/sin $\phi$)

wherein: $\phi$ = the acute angle of the side wall of each gripping tooth.

In the above formula, in a preferred embodiment, the angle $\phi$ is approximately 60°.

Length of the Pipe Receiving End of the Coupling Body Extending Beyond the Isolation Gripping Teeth (M1):

The length of the pipe receiving end which extends beyond the isolation gripping teeth 106 is described by the following formula:

$M1$ = length of receiving end extending beyond the isolation gripping teeth = $C10 \times$ (width of the groove means located between the main sealing tooth means and the isolation tooth means)

wherein $C10 = 0.1$ to 0.5.

In this formula, the width of the groove located between the main sealing tooth and the isolation tooth means is described with respect to the embodiments of FIGS. 1 through 7B.

Length From the Edge of the Coupling Body to the Start of the Ramp (N1)

The distance between the edge 118 and the start of the ramp 120 as seen in FIG. 9 is given by the following formula:

$N1$ = distance to the star of the ramp = (length of the pipe receiving end) − ($C11$) × (thickness of a gripping tooth + width of a groove between adjacent gripping teeth)

where $C11 = 1$ to 5.

Angle of the Ramp (B)

The angle of the ramp in a preferred embodiment is seen by the formula:
$B = 5$ to 12°.

Outside Diameter of the Cylindrical Surface Between the Ramp 120 and the End 118 (D1)

The outside diameter of the pipe receiving end 112 is given by the formula:

$D1$ = pipe receiving end outside diameter = (swage ring trailing edge internal diameter) + [(internal diameter of pipe receiving end) − (pipe outside diameter)] + amount of pipe deformation required adjacent the isolation tooth means).

In this formula the amount of pipe deformation required adjacent the isolation tooth means is the amount required to prevent relative motion between the coupling body and the pipe and is previously discussed as the theoretical pipe deformation at this point.

Industrial Applicability

The present invention is designed to successfully bring together two pipe ends or tubes and meet burst pressure and shear loading required. In operation, the pipes are fit into opposite ends of the coupling body. After this has been accomplished, the swage rings are forced over the coupling body in order to compress the reverse taper and the coupling body, forcing the teeth to bite into the pipes creating the hermetic seal that is resistant to tensile loads and bending. An appropriate hydraulic tool for causing the swage rings to be driven over the coupling body is disclosed in U.S. Pat. No. 4,189,817, issued Feb. 26, 1980 and entitled "HYDRAULIC ASSEMBLY TOOL FOR TUBE FITTINGS" which is licensed to the assignee of this invention and which is incorporated herein by reference.

Other objects and advantages of the present invention can be obtained from a review of the figures and the appended claims.

It is to be understood that other embodiments of the present invention can be constructed which fall within the spirit and scope of the appended claims.

What is claimed is:

1. A pipe fitting for making pipe connections comprising:
   a coupling body with a body inner surface and a pipe receiving end adapted for receiving a pipe, and a body outer surface;
   a swage ring which defines a ring inner surface, which ring inner surface is urgeable over the body outer surface in order to cause at least part of the body inner surface to engage the pipe to create a seal;
   said body inner surface defining a main tooth means for biting into the pipe creating a main seal between the coupling body and the pipe as the swage ring is urged over the body outer surface;
   said body inner surface defining an isolation tooth means located outboard of the main tooth means and adjacent the pipe receiving end for isolating the main tooth means from bending stresses, wherein said isolation tooth means includes a plurality of gripping teeth for engaging and biting into the pipe as the swage ring is urged over the coupling body; and
   wherein body inner surface defines a groove means between the isolation tooth means and the main tooth means for substantially allowing the original shape of the pipe to be maintained adjacent the groove means with the main tooth means and these isolation tooth means engaging the pipe.

2. The pipe fitting of claim 1 wherein:
said body outer surface adjacent the isolation tooth means defines a ramp which slopes upwardly in a direction away from the pipe receiving end.

3. The pipe fitting of claim 2 wherein the angle of the ramp is between about C12 degrees:
where $C12 = 5°$ to 12°.

4. The pipe fitting of claim 1 wherein:

said plurality of gripping teeth includes gripping teeth located proximately to the main tooth means and gripping teeth located distally from the main tooth means; and wherein said body outer surface adjacent the isolation tooth means is configured in such a way relative to the isolation tooth means such that the gripping teeth located proximally to the main tooth means are urged more toward the pipe than the gripping teeth located distally from the main tooth means.

5. The pipe fitting of claim 1 wherein:

said body outer surface induces a ramp which increases in height toward the main tooth means from a point just before the beginning of the distal teeth to a point just before the ending of the proximal teeth.

6. The pipe fitting of claim 1 wherein:

said plurality of gripping teeth includes gripping teeth located proximately to the main tooth means and gripping teeth located distally from the main tooth means; and wherein said body outer surface adjacent the isolation tooth means is configured in such a way relative to the isolation tooth means such that minimum pipe deformation occurs adjacent the distal teeth and maximum pipe deformation occurs adjacent the proximal teeth.

7. The pipe fitting of claim 1 wherein said main tooth means has a parent tooth and wherein each of the gripping teeth have a width defined as about:

$$\text{width of each gripping tooth} = C7 \times (\text{width of the parent tooth})$$

where $C7 = 0.05$ to $0.4$.

8. The pipe fitting of claim 7 wherein the number of gripping teeth desired to resist axial shear forces caused by pipe bending is described as about:

$$\text{number of teeth} = [(\text{cross-sectional area of the pipe based on the outside diameter}) \times (\text{bending stress}) \times (\text{safety factor})] / [(\text{width of each tooth}) \times (\text{internal diameter of coupling body}) \times (pi)].$$

9. The pipe fitting of claim 1 wherein there is a gripping tooth groove between adjacent gripping teeth and the depth of each groove is described as about:

$$\text{gripping tooth depth} = C8 \times (\text{theoretical percent deformation at the pipe receiving end}) \times (\text{pipe outside diameter})/2$$

where $C8 = 0.2$ to $1$.

10. The pipe fitting of claim 1 wherein the body inner surface at the pipe receiving end has a diameter relative to the pipe that with the pipe inserted into the pipe receiving end, the body inner surface at the pipe receiving end contacts the pipe outer surface in the range of about almost touching the pipe outer surface to elastically deforming the pipe outer surface so that there is no permanent deformation that would interfere with the gripping teeth in biting into the pipe.

11. The pipe fitting of claim 1 wherein:

the gripping teeth are spaced apart from each other by a distance which is about:

$$\text{distance between adjacent gripping teeth} = C9 \times (\text{width of a gripping tooth})$$

wherein $C9 = 1$ to $5$.

12. The pipe fitting of claim 1 wherein:

the span of the gripping teeth is about:

$$\begin{aligned}\text{span} = &(\text{number of gripping teeth}) (\text{width of each gripping tooth}) + (\text{number of gripping teeth} - 1) \\ &(\text{distance between adjacent gripping teeth}) - 2 \\ &(\text{number of gripping teeth}) (\text{gripping tooth grooves depth}/\sin \phi)\end{aligned}$$

wherein: $\phi$ = the acute angle of the side wall of each gripping tooth.

13. The pipe fitting of claim 1 wherein:

the length of the pipe receiving end extending beyond the gripping teeth is about:

$$\text{length of receiving end} = C10 \times (\text{width of the groove means located between the main tooth means and the isolation tooth means})$$

where $C10 = 0.1$ to $0.5$.

14. The pipe fitting of claim 1 wherein the body outer surface adjacent the isolation tooth means defines a ramp which slopes upwardly in a direction away from the pipe receiving end and wherein the distance to the start of the ramp from outside edge of the pipe receiving end is about:

$$\begin{aligned}\text{distance to the start of the ramp} = &(\text{length of the pipe receiving end}) - C11 \times (\text{thickness of a gripping tooth} + \text{width of a groove between adjacent gripping teeth})\end{aligned}$$

where $C11 = 1$ to $5$.

15. The pipe fitting of claim 1 wherein the outer diameter of the pipe receiving end is about:

$$\begin{aligned}\text{pipe receiving end outside diameter} = &(\text{swage ring trailing edge internal diameter}) + [(\text{internal diameter of pipe receiving end}) - (\text{pipe outside diameter})] + \text{amount of pipe deformation required adjacent the isolation tooth means}).\end{aligned}$$

16. A pipe fitting for making pipe connections comprising:

a coupling body with a body inner surface and a pipe receiving end adapted for receiving a pipe, and a body outer surface;

a swage ring which defines a ring inner surface, which ring inner surface is urgeable over the body outer surface in order to cause at least part of the body inner surface to engage the pipe to create a seal;

said body inner surface defining a main tooth means for biting into the pipe creating a main seal between the coupling body and the pipe as the swage ring is urged over the body outer surface;

said body inner surface defining an isolation tooth means located outboard of the main tooth means and adjacent the pipe receiving and for isolating the main tooth means from bending stress; and wherein said isolation tooth means includes a plurality of gripping teeth for engaging and biting into the pipe as the swage ring is urged over the coupling body.

17. A pipe fitting for making pipe connections comprising:

a coupling body with a body inner surface and a pipe receiving end adapted for receiving a pipe, and a body outer surface;

a swage ring which defines a ring inner surface, which ring inner surface is urgeable over the body outer surface in order to cause at least part of the body inner surface to engage the pipe to create a seal;

said body inner surface defining a main tooth means for biting into the pipe creating a main seal between the coupling body and the pipe as the swage ring is urged over the body outer surface;

said body inner surface defining an isolation tooth means located outboard of the main tooth means and adjacent the pipe receiving end for isolating the main tooth means for bending stress; and wherein the isolation tooth means includes means for contacting the pipe at a plurality of locations in order to produce a reducing gradient of pipe deformation in a direction toward the pipe receiving end of the coupling body.

18. A pipe fitting for making pipe connections comprising:

a coupling body with a body inner surface and a pipe receiving end adapted for receiving a pipe, and a body outer surface;

a swage ring which defines a ring inner surface, which ring inner surface is urgeable over the body outer surface in order to cause at least part of the body inner surface to engage the pipe to create a seal;

said body inner surface defining a main tooth means for biting into the pipe creating a main seal between the coupling body and the pipe as the swage ring is urged over the body outer surface;

said body inner surface defining an isolation tooth means located outboard of the main tooth means and adjacent the pipe receiving end for isolating the main tooth means for bending stress; and wherein the isolation tooth means includes means for producing a reducing gradient of pipe deformation in the direction toward the pipe receiving end of the coupling body.

19. The pipe fitting of claim 18 including said isolation tooth means for allowing contact of the body inner surface and the pipe at the pipe receiving and due to the configuration of the reducing gradient producing means.

20. The pipe fitting of claim 18 wherein said isolation tooth means includes a plurality of gripping teeth.

21. The pipe fitting of claim 20 wherein:

said plurality of gripping teeth includes gripping teeth located proximally to the main tooth means and gripping teeth located distally from the main tooth means; and wherein said body outer surface adjacent the isolation tooth means is configured in such a way relative to the isolation tooth means so that minimum pipe deformation occurs adjacent the distal teeth and maximum pipe deformation occurs adjacent the proximal teeth.

22. The pipe fitting of claim 20 wherein said main tooth means has a parent tooth and wherein each of the gripping teeth have a width defined as about:

width of each gripping tooth = $C7 \times$ (width of the parent tooth)

where $C7 = 0.05$ to $0.4$.

23. The pipe fitting of claim 22 wherein the number of gripping teeth desired to resist axial shear forces caused by pipe bending is described as about:

number of teeth = [(cross-sectional area of the pipe based on the outside diameter) × (bending stress) × (safety factor)]/[(width of each tooth) × (internal diameter of coupling body) × $(pi)$].

24. The pipe fitting of claim 20 wherein:

said plurality of gripping teeth includes gripping teeth located proximally to the main tooth means and gripping teeth located distally from the main tooth means; and wherein said body outer surface adjacent the isolation tooth means is configured in such a way with respect to the isolation tooth means such that the gripping teeth located proximally to the main tooth means are urged more toward the pipe than the gripping teeth located distally from the main tooth means.

25. The pipe fitting of claim 14 wherein:

said body outer surface includes a ramp which increases in height toward the main tooth means from a point just before the beginning of the distal teeth to a point just before the ending of the proximal teeth.

26. The pipe fitting of claim 20 wherein there is a gripping tooth groove between adjacent gripping teeth and the depth of each groove is described as about:

gripping tooth groove depth = $C8 \times$ (theoretical percent deformation at the pipe receiving end) × (pipe outside diameter)/2 where $C8 = 0.2$ to $1$.

27. The pipe fitting of claim wherein:

the gripping teeth are spaced apart from each other by a distance which is about:

distance between adjacent gripping teeth = $C9 \times$ (width of a gripping tooth)

wherein $C9 = 1$ to $5$.

28. The pipe fitting of claim 20 wherein:

the span of the gripping teeth is about:

span = (number of gripping teeth) (width of each gripping tooth) + (number of gripping teeth − 1) (distance between adjacent gripping teeth) ÷ 2 (number of gripping teeth) (gripping tooth grooves depth/sin $\phi$)

wherein: $\phi$ = the acute angle of the side wall of each gripping tooth.

29. The pipe fitting of claim 20 wherein the body outer surface adjacent the isolation tooth means defines a ramp which slopes upwardly in a direction away from the pipe receiving end and wherein the distance to the start of the ramp from outside edge of the pipe receiving end is about:

distance to the start of the ramp = (length of the pipe receiving end) − $C11 \times$ (thickness of a gripping tooth + width of a groove between adjacent gripping teeth)

wherein $C11 = 1$ to $5$.

30. The pipe fitting of claim 18 wherein:

said body outer surface adjacent the isolation tooth means defines a ramp which slopes upwardly in a direction away from the pipe receiving end.

31. The pipe fitting of claim 30 wherein the angle of the ramp is between about $C12$ degrees where $C12 = 2°$ to $15°$.

32. The pipe fitting of claim 18 wherein the body inner surface at the pipe receiving end has a diameter relative to the pipe that with the pipe inserted into the pipe receiving end, the body inner surface at the pipe receiving end contacts the pipe outer surface in the range of about almost touching the pipe outer surface to elastically deforming the pipe outer surface so that there is no permanent deformation that would interfere with the isolation tooth means producing a reducing gradient of pipe deformation.

33. The pipe fitting of claim 18 wherein:
the length of the pipe receiving end extending beyond the isolation tooth means is about:

length of receiving end = $C10$*(width of the groove means located between the main tooth means and the isolation tooth means)

where $C10 = 0.1$ to $0.5$.

34. The pipe fitting of claim 18 wherein the outer diameter of the pipe receiving end is about:

pipe receiving end outside diameter = (swage ring trailing edge internal diameter) + [(internal diameter of pipe receiving end) − (pipe outside diameter)] + amount of pipe deformation required adjacent the isolation tooth means).

35. A pipe fitting adapted for making pipe connections comprising:
a coupling body with a body inner surface and a pipe receiving end adapted for receiving a pipe, and a body outer surface;
a swage ring which defines a ring inner surface, which ring inner surface is urgeable over the body outer surface in order to cause at least part of the body inner surface to engage the pipe to create a seal;
said body inner surface defining a main tooth means adapted for biting into the pipe creating a main seal between the coupling body and the pipe as the swage ring is urged over the body outer surface;
said body inner surface defining an isolation tooth means located outboard of the main tooth means and adjacent the pipe receiving end for isolating the main tooth means for bending stress; and
wherein the isolation tooth means includes means for producing a plurality of deformations in the pipe reducing in size toward the pipe receiving end.

36. The pipe fitting of claim 35 including said isolation tooth means for substantially allowing contact of the body inner surface and the pipe, at the pipe receiving end, due to the configuration of the deformation producing means.

* * * * *

UNITED STATES PATENT AND TRADEMARK OFFICE
CERTIFICATE OF CORRECTION

PATENT NO. : 5,114,191
DATED : May 19, 1992
INVENTOR(S) : Sobel A. Sareshwala

It is certified that error appears in the above-indentified patent and that said Letters Patent is hereby corrected as shown below:

Column 1, line 68, detete the word "rooking" and insert in its place --rocking--.
Column 6, line 65, insert the words --General Formula:--.
Column 7, line 13, after the word "diameter)]" delete the letters "ps"--.
Column 7, line 37, detete the word "he" and insert in its place --the--.
Column 7, line 41, after the word "thickness", insert the symbol --†--.
Column 7, line 54, after the word "tooth/2", insert the symbol --†--.
Column 7, line 57, after the word "thickness", insert the symbol --†--.
Column 7, line 57, after the word "thickness", insert the symbol --*--.
Column 8, line 17, after the word "thickness" delete the symbol "*" and insert in its place --†--.
Column 9, line 22, delete the word "copier" and insert in its place the word --copper--.
Column 10, line 30, delete the "=" and insert in its place-- - --.
Column 11, line 21, insert --General Formula:--.
Column 11, line 32, insert --General Formula:--.
Column 15, line 15, after the word "teeth", insert the numeral --108--.
Column 18, line 56, after the word "receiving", delete the word "and" and insert in its place --end--.
Column 20, line 32, after the word "claim", insert the numeral --20--.

Signed and Sealed this

Twenty-eighth Day of September, 1993

Attest:

BRUCE LEHMAN

*Attesting Officer*     *Commissioner of Patents and Trademarks*